(12) United States Patent
Fujieda et al.

(10) Patent No.: US 8,565,515 B2
(45) Date of Patent: *Oct. 22, 2013

(54) THREE-DIMENSIONAL RECOGNITION RESULT DISPLAYING METHOD AND THREE-DIMENSIONAL VISUAL SENSOR

(75) Inventors: Shiro Fujieda, Kyoto (JP); Atsushi Taneno, Kyoto (JP); Hiroshi Yano, Toyonaka (JP); Yasuyuki Ikeda, Ikeda (JP)

(73) Assignee: Omron Corporation, Kyoto-shi (JP)

( * ) Notice: Subject to any disclaimer, the term of this patent is extended or adjusted under 35 U.S.C. 154(b) by 400 days.

This patent is subject to a terminal disclaimer.

(21) Appl. No.: 12/711,018

(22) Filed: Feb. 23, 2010

(65) Prior Publication Data

US 2010/0232647 A1 Sep. 16, 2010

(30) Foreign Application Priority Data

Mar. 12, 2009 (JP) ................................. 2009-059923

(51) Int. Cl.
*G06K 9/00* (2006.01)

(52) U.S. Cl.
USPC ........... 382/154; 382/113; 382/294; 382/284; 382/285; 382/170; 382/283

(58) Field of Classification Search
CPC ......... G06T 15/00; G06T 15/20; G06T 17/00; G06K 9/00201
USPC .......... 382/154, 113, 294, 284, 285, 170, 283
See application file for complete search history.

(56) References Cited

U.S. PATENT DOCUMENTS

| | | | |
|---|---|---|---|
| 5,864,632 A * | 1/1999 | Ogawa et al. ................. | 382/113 |
| 6,278,798 B1 * | 8/2001 | Rao .............................. | 382/154 |
| 6,330,356 B1 | 12/2001 | Sundareswaran et al. | |

(Continued)

FOREIGN PATENT DOCUMENTS

| | | |
|---|---|---|
| JP | 10-122819 | 5/1998 |
| JP | 10-160464 A | 6/1998 |

(Continued)

OTHER PUBLICATIONS

Kawai, Y. et al., "Stereo Correspondence Using Segment Connectivity", Journal of Information Processing, vol. 40, No. 8, Aug. 1999, pp. 3219-3229.

(Continued)

*Primary Examiner* — Mike Rahmjoo
(74) *Attorney, Agent, or Firm* — Foley & Lardner LLP

(57) ABSTRACT

In the present invention, whether three-dimensional measurement or checking processing with a model is properly performed by setting information and recognition processing result can easily be confirmed. After setting processing is performed to a three-dimensional visual sensor including a stereo camera, a real workpiece is imaged, the three-dimensional measurement is performed to an edge included in a produced stereo image, and restored three-dimensional information is checked with a three-dimensional model to compute a position of the workpiece and a rotation angle for an attitude indicated by the three-dimensional model. Thereafter, perspective transformation of the three-dimensional information on the edge obtained through measurement processing and the three-dimensional model to which coordinate transformation is already performed based on recognition result is performed into a coordinate system of a camera that performs the imaging, and projection images are displayed while being able to be checked with each other.

8 Claims, 5 Drawing Sheets

(56) References Cited

U.S. PATENT DOCUMENTS

| | | | |
|---|---|---|---|
| 6,445,815 | B1 | 9/2002 | Sato |
| 6,480,627 | B1 | 11/2002 | Mathias et al. |
| 6,915,072 | B2 | 7/2005 | Takahashi et al. |
| 7,003,136 | B1 | 2/2006 | Harville |
| 7,167,583 | B1 | 1/2007 | Lipson et al. |
| 7,231,081 | B2 | 6/2007 | Snow et al. |
| 7,277,599 | B2 | 10/2007 | Eian et al. |
| 7,526,121 | B2 | 4/2009 | Ban et al. |
| 8,126,260 | B2 * | 2/2012 | Wallack et al. ............ 382/154 |
| 8,170,295 | B2 | 5/2012 | Fujii et al. |
| 8,295,588 | B2 | 10/2012 | Fujieda et al. |
| 2002/0187831 | A1 | 12/2002 | Arikawa et al. |
| 2003/0152276 | A1 | 8/2003 | Kondo et al. |
| 2004/0051783 | A1 | 3/2004 | Chellappa et al. |
| 2004/0153671 | A1 | 8/2004 | Schuyler et al. |
| 2004/0247174 | A1 | 12/2004 | Lyons et al. |
| 2005/0084149 | A1 | 4/2005 | Aizawa et al. |
| 2005/0111703 | A1 | 5/2005 | Merbach et al. |
| 2005/0249400 | A1 | 11/2005 | Fukumoto |
| 2005/0249434 | A1 | 11/2005 | Xu et al. |
| 2005/0280645 | A1 * | 12/2005 | Nagata et al. ............ 345/419 |
| 2005/0286767 | A1 | 12/2005 | Hager et al. |
| 2006/0050087 | A1 | 3/2006 | Tanimura et al. |
| 2006/0050952 | A1 | 3/2006 | Blais et al. |
| 2006/0182308 | A1 | 8/2006 | Gerlach et al. |
| 2006/0232583 | A1 * | 10/2006 | Petrov et al. ............ 345/419 |
| 2007/0014467 | A1 | 1/2007 | Bryll |
| 2007/0081714 | A1 | 4/2007 | Wallack et al. |
| 2008/0025616 | A1 | 1/2008 | Bryll |
| 2008/0123937 | A1 | 5/2008 | Arias Estrada et al. |
| 2008/0212887 | A1 | 9/2008 | Gori et al. |
| 2008/0260227 | A1 * | 10/2008 | Hayashi et al. ............ 382/131 |
| 2008/0303814 | A1 | 12/2008 | Ishiyama |
| 2009/0222768 | A1 * | 9/2009 | Roe et al. ............ 715/850 |
| 2009/0309893 | A1 * | 12/2009 | Boothroyd et al. ............ 345/581 |
| 2010/0231690 | A1 | 9/2010 | Fujieda et al. |
| 2010/0231711 | A1 | 9/2010 | Taneno et al. |
| 2010/0232681 | A1 | 9/2010 | Fujieda et al. |
| 2010/0232682 | A1 | 9/2010 | Fujieda et al. |
| 2010/0232683 | A1 | 9/2010 | Fujieda et al. |
| 2010/0232684 | A1 | 9/2010 | Fujieda et al. |
| 2011/0150280 | A1 | 6/2011 | Tsuji |
| 2011/0218776 | A1 | 9/2011 | Shono et al. |
| 2012/0050525 | A1 | 3/2012 | Rinner et al. |

FOREIGN PATENT DOCUMENTS

| | | |
|---|---|---|
| JP | 10-269362 A | 10/1998 |
| JP | 2961264 | 8/1999 |
| JP | 2000-094374 A | 4/2000 |
| JP | 2005-017286 A | 1/2005 |
| JP | 2006-250889 A | 9/2006 |
| JP | 2007-064836 A | 3/2007 |
| JP | 2007-249592 | 9/2007 |

OTHER PUBLICATIONS

USPTO Notice of Allowance on U.S. Appl. No. 12/711,179 dated Jan. 27, 2012; 12 pages.
USPTO Office Action on U.S. Appl. No. 12/710,266 dated Feb. 23, 2012; 11 pages.
Zhengyou Zhang, A Flexible New Technique for Camera Calibration, Technical Report MSR-TR-98-71; Dec. 2, 1998, Microsoft Research, Microsoft Corporation, Redmond, WA 98052; pp. 1-21.
USPTO Final Office Action on U.S. Appl. No. 12/710,266 dated Jul. 16, 2012; 16 pages.
USPTO Non-final Office Action on U.S. Appl. No. 12/711,976 dated Jun. 26, 2012; 12 pages.
USPTO Notice of Allowance on U.S. Appl. No. 12/711,028 dated Jun. 22, 2012; 11 pages.
USPTO Notice of Allowance on U.S. Appl. No. 12/711,196 dated Jun. 13, 2012; 11 pages.
USPTO Non-final Action on U.S. Appl. No. 12/711,028 dated Mar. 16, 2012; 12 pages.
USPTO Notice of Allowance on U.S. Appl. No. 12/711,179 dated Mar. 15, 2012; 6 pages.
U.S. Appl. No. 13/633,536, filed Oct. 2, 2012, Shiro, et al.
Paglieroni, David W.; Short Communication—A Unified Distance Transform Algorithm and Architecture; Machine Vision and Applications (1992) 5:47-55.
US Non-final Office Action on U.S. Appl. No. 12/711,814 dated Nov. 21, 2012; 16 pages.
USPTO Final Office Action on U.S. Appl. No. 12/711,976 mailed Dec. 11, 2012; 10 pages.
USPTO Non-final Office Action on U.S. Appl. No. 12/710,266 mailed Oct. 24, 2012; 13 pages.
Fiala, et al.; Fully Automatic Camera Calibration Using Self-identifying Calibration Targets; pp. 1-26; Nov. 2005; National Research Council, Canada.
USPTO Final Office Action on U.S. Appl. No. 12/710,266 mailed Jan. 29, 2013; 12 pages.
USPTO Non-final Office Action on U.S. Appl. No. 12/712,015 mailed Jan. 29, 2013; 16 pages.
Japan Patent Office Notice of Grounds of Rejection mailed Dec. 11, 2012; pp. 1-2; with English translation.
Sumi, Yasushi, et al.; Three-Dimensional Object Recognition Using Stereo Vision; May 1997; pp. 1105-1112; Transactions of the Institute of Electronics, Information and Communication Engineers, Japan, vol. J80-D-II, No. 5.
Camera Calibration: Calibrating methods for stereo cameras; Sentience: A 3D volumetric perception system for mobile robots; Aug. 20, 2009; retrieved Mar. 10, 2013; <<http://code.google.com/p/sentience/wiki/CameraCalibration>>; 6 pages.
Fiala, et al.; Fully Automatic Camera Calibration Using Self-identifying Calibration Targets; Nov. 2005; pp. 1-26; National Research Council, Canada.
Japan Patent Office action on application 2009-059919 mailed Mar. 12, 2013; pp. 1-3; with partial English translation.
Japan Patent Office action on application 2009-059921 mailed Mar. 12, 2013; pp. 1-3; with partial English translation.
Rusinkiewicz, Szymon, et al.; Efficient Variants of the ICP Algorithm; Proc. 3DIM 2001; pp. 1-8.
USPTO Non-final Action on U.S. Appl. No. 12/711,976 mailed Jun. 5, 2013; 16 pages.
USPTO Notice of Allowance on U.S. Appl. No. 12/711,814 mailed Mar. 14, 2013; 12 pages.

* cited by examiner

THREE-DIMENSIONAL RECOGNITION RESULT DISPLAYING METHOD AND THREE-DIMENSIONAL VISUAL SENSOR

BACKGROUND OF THE INVENTION

The present invention is based on Japanese Patent Application No. 2009-059923 filed with the Japan Patent Office on Mar. 12, 2009, the entire content of which is hereby incorporated by reference.

TECHNICAL FIELD

The present invention relates to a method for recognizing a position and an attitude of a recognition-target object to display the recognition result by checking three-dimensional information obtained by three-dimensional measurement based on image processing with a three-dimensional model expressing a whole three-dimensional contour shape of the recognition-target object, and a three-dimensional visual sensor to which the method is adopted.

RELATED ART

For example, when three-dimensional recognition processing is performed in order to cause a robot to grasp a component in a manufacturing scene, three-dimensional information restored by the three-dimensional measurement of a stereo camera is checked with the previously registered three-dimensional model of the recognition-target object to recognize a position and attitude (specifically, a rotation angle with respect to three-dimensional model) of the recognition-target object (for example, see Japanese Unexamined Patent Publication No. 2000-94374).

As disclosed in Japanese Unexamined Patent Publication Nos. 2000-94374 and H10-269362, in this kind of three-dimensional recognition processing, generally the three-dimensional measurement or the checking processing with the model is performed to target an edge in a processing target image.

Recently the applicant develops a general-purpose three-dimensional visual sensor. In such a general-purpose three-dimensional visual sensor, it is necessary that a user perform setting processing such as camera positioning, calibration, and three-dimensional model registration processing. Additionally, for the measurement condition of the three-dimensional measurement, there are items such as a noise reduction reference and density gradient strength used as an edge certifying reference, which the user sets according to a processing purpose or a recognition-target object.

Accordingly, the three-dimensional information restored by the processing target image depends on not only the position and attitude of the recognition-target object, but also contents of the information set by the user. For reduced accuracy of the setting information, the three-dimensional information is not correctly restored, or a large amount of three-dimensional information of noise is generated, which causes a problem in that possibly an error is generated in the checking with the three-dimensional model. Therefore, it is necessary that the general-purpose three-dimensional visual sensor have a function of being able to easily confirm whether contents are properly set.

As to recognition result display, because only displaying a coordinate or a rotation angle of the recognized position is difficult for the user to understand, there is a need for display to be able to easily confirm the recognition result.

SUMMARY

The present invention has been devised to solve the problems described above, and an object thereof is to easily confirm whether three-dimensional measurement or checking processing with a model can properly be performed by setting information and to easily confirm a recognition processing result after the confirmation is ended.

In accordance with one aspect of the present invention, there is provided a three-dimensional recognition result displaying method wherein three-dimensional information on an edge in an image is obtained through measurement processing with the image produced by imaging a predetermined recognition-target object; and a recognition result is displayed after a position and an attitude of the recognition-target object are recognized by checking the three-dimensional information with a three-dimensional model expressing an outline shape of a whole of the recognition-target object. The method includes a first step and a second step described below.

The first step performs perspective transformation of three-dimensional information on the edge obtained through the measurement processing and three-dimensional model to which coordinate transformation is performed based on the recognized position and the attitude of the recognition-target object into a coordinate system of an imaging unit that performs the imaging.

The second step displays an edge projection image of the recognition-target object produced by the perspective transformation and a projection image of the three-dimensional model such that the edge projection image and the projection image can be checked with each other.

In the above-described method, the perspective transformation of the three-dimensional model, to which the coordinate transformation is already performed based on the three-dimensional information on the edge of recognition-target object and the recognition result, is performed into a coordinate system of the imaging unit used in the imaging, so that the projection image that is seen similar to the contour pattern generated in the image in actually imaging the body having the three-dimensional information can be produced. Therefore, the user can confirm which region edge of the recognition-target object is restored as the three-dimensional information and how much the three-dimensional information is accurately restored from the contour pattern expressed by the projection image of the edge of recognition-target object. The two kinds of projection images can be checked to make determination whether the recognition result with the three-dimensional model is proper based on the confirmation which point of the measured edge corresponds to that of the three-dimensional model.

In the second step, for example, the edge projection image of the recognition-target object and the projection image of the three-dimensional model may be displayed in parallel, the edge projection image and the projection image may be displayed while superimposed on each other, or the edge projection image and the projection image may alternately be displayed according to a switching manipulation.

In accordance with another aspect of the present invention, a three-dimensional visual sensor according to the present invention includes: an imaging unit that images a predetermined recognition-target object; a measurement unit that obtains three-dimensional information on an edge in an image through measurement processing with the image produced by the imaging unit; a registration unit that registers a three-dimensional model expressing an contour shape of a whole of the recognition-target object; a recognition unit that recognizes a position and an attitude of the recognition-target object by checking the three-dimensional information obtained by the measurement unit with the registered three-dimensional model; a perspective transformation unit that performs perspective transformation of three-dimensional information on the edge obtained by the measurement unit and three-dimensional model to which coordinate transformation is performed based on the recognized position and the attitude of the recognition-target object into a coordinate system of the imaging unit; and a display control unit that displays an edge projection image of the recognition-target object produced by the perspective transformation and a projection image of the three-dimensional model on a monitor device such that the edge projection image and the projection image can be checked with each other.

In the above configuration, desirably a stereo camera including a plurality of cameras is used as the imaging unit, and a unit that obtains the three-dimensional information using a stereo image produced by the stereo camera is used as the measurement unit. However, the configuration is not limited thereto, and for example, the imaging unit may include one camera by adopting a light sectioning method.

In the above-described three-dimensional recognition result displaying method and the three-dimensional visual sensor, the image indicating the measurement result of the three-dimensional information on the edge and the image indicating the recognition result with the three-dimensional model are displayed while being able to be checked with each other. Therefore, the confirmation whether the setting information is proper and the confirmation of the recognition result can easily be made to considerably enhance user-friendliness of the three-dimensional visual sensor.

DETAILED DESCRIPTION

Figure 1:
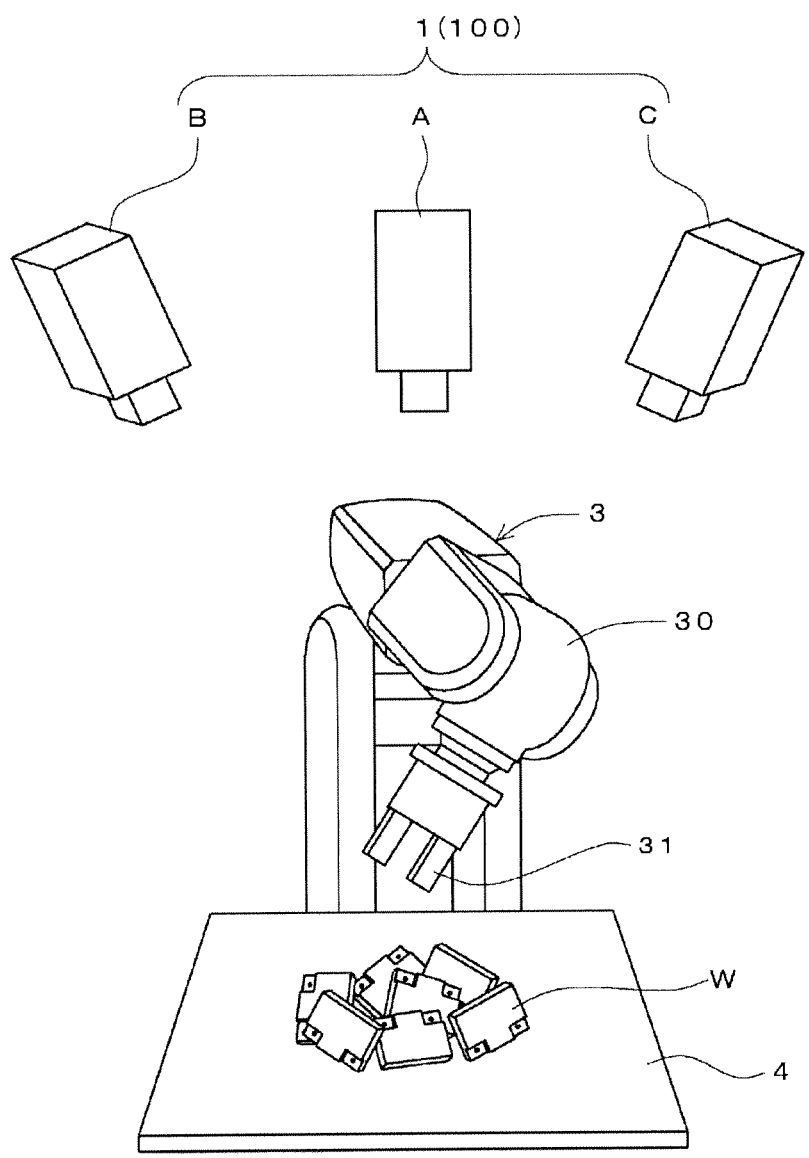
FIG. 1 illustrates an example of a picking system to which a three-dimensional visual sensor is introduced.

FIG. 1 illustrates an example of a picking system to which a three-dimensional recognition processing is introduced.

The picking system of FIG. 1 is aimed at individually picking up components W (hereinafter referred to as "workpieces W") in bulk on a support plate 4, carrying the workpiece W to another site, and arraying the workpieces W. The picking system includes a robot 3 that performs picking work, a three-dimensional visual sensor 100 including a stereo camera 1, and a robot controller (not illustrated).

The robot 3 includes a multijoint arm unit 30 in which a hand unit 31 is provided at leading end thereof, and operations of the arm unit 30 and hand unit 31 are controlled by a control signal transmitted from the robot controller.

The stereo camera 1 includes three cameras A, B, and C that are horizontally disposed above a work space of the robot 3. The central camera A is disposed while an optical axis of the central camera A is orientated toward a vertical direction (that is, central camera A sees the support plate 4 of the workpiece W from the front), and the right and left cameras B and C are disposed while optical axes are inclined.

Figure 2:
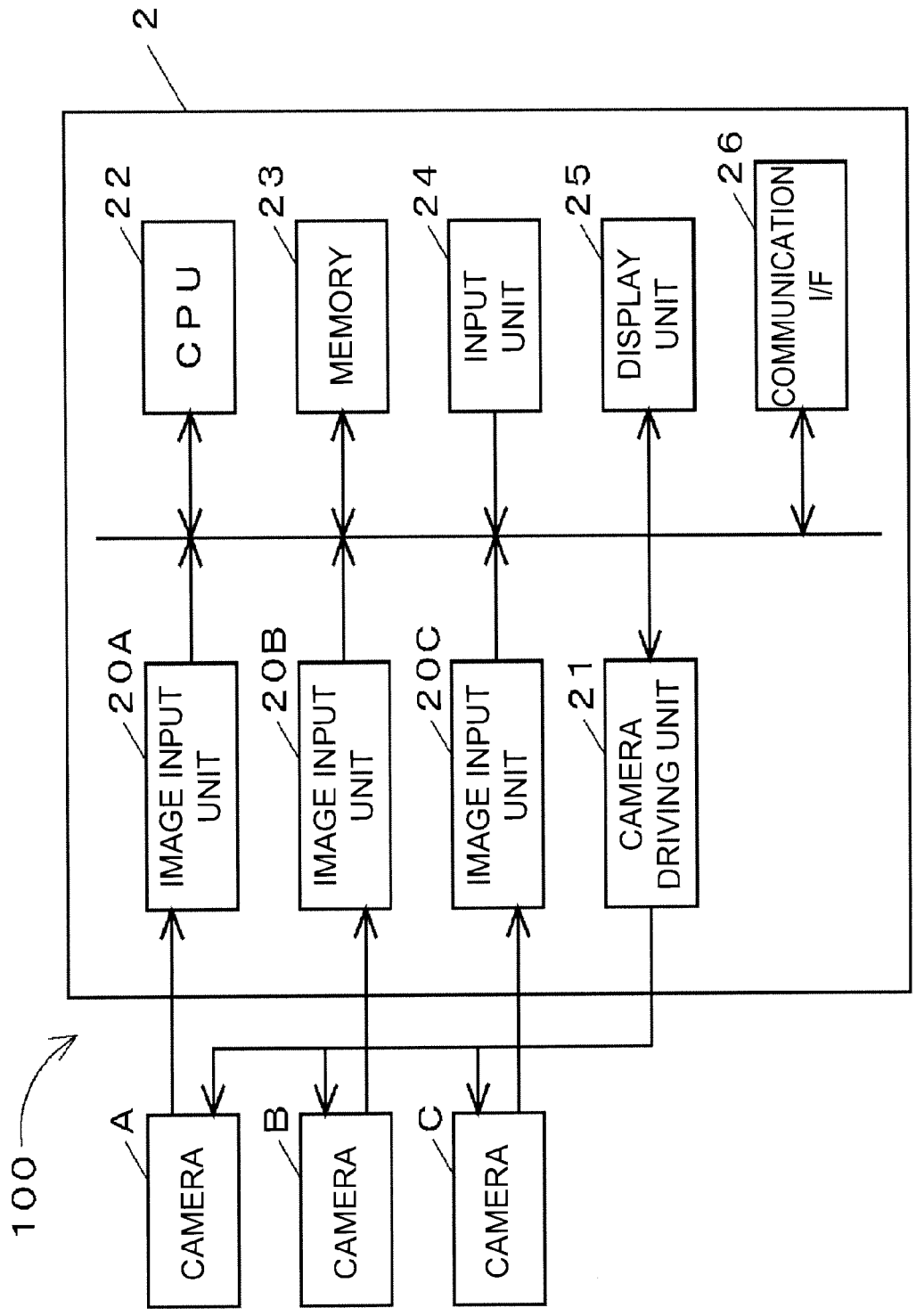
FIG. 2 is a block diagram illustrating an electric configuration of the three-dimensional visual sensor.

FIG. 2 is a block diagram illustrating a configuration of the three-dimensional visual sensor 100 of the embodiment.

The three-dimensional visual sensor 100 includes the cameras A, B, and C and a recognition processing device 2. The recognition processing device 2 is a personal computer in which a dedicated program is stored. In the recognition processing device 2, after three-dimensional information on the edge is obtained by stereo measurement of the edges in the images produced by the cameras A, B, and C, the three-dimensional information is checked with a previously-registered three-dimensional model to recognize a position and an attitude of the workpiece W.

The configuration of the recognition processing device 2 will specifically be described. The recognition processing device 2 includes image input units 20A, 20B, and 20C corresponding to cameras A, B, and C, a camera driving unit 21, CPU 22, a memory 23, an input unit 24, a display unit 25, and a communication interface 26.

The camera driving unit 21 simultaneously drives the cameras A, B, and C in response to a command provided from the CPU 22. Therefore, the images produced by the cameras A, B, and C are inputted to the CPU 22 through the image input units 20A, 20B, and 20C.

The display unit 25 is a monitor device including a liquid crystal panel, and the input unit 24 includes a keyboard and a mouse. In setting information necessary for calibration processing and the recognition of the workpiece W, the input unit 24 and the display unit 25 are used to input setting information and to display information for assisting work. The communication interface 26 is used to conduct communication with the robot controller.

The memory 23 includes a large-capacity memory such as a ROM, RAM, and a hard disk. The programs for the calibration processing, production of the three-dimensional model, and three-dimensional recognition processing of the workpiece W and setting data are stored in the memory 23.

Based on the program in the memory 23, the CPU 22 performs the calibration processing, derives a parameter for three-dimensional measurement and registers the parameter for three-dimensional measurement in the memory 23. The calibration processing will simply be described. In the embodiment, using a calibration plate (not illustrated) in which a predetermined calibration pattern is drawn, a world coordinate system is defined such that a distance from an upper surface of the support plate 4 of FIG. 1 becomes a Z-coordinate indicating a height. The imaging of the calibration plate and the image processing are performed in a plurality of cycles, a plurality of combinations of three-dimensional coordinates (X, Y, Z) and two-dimensional coordinates (x, y) are specified in each of the cameras A, B, and C, and a 3×4 perspective transformation matrix adopted to the following transformation equation (equation (1)) is derived using the combination of the coordinates.

[Formula 1]

$$S \begin{pmatrix} x \\ y \\ 1 \end{pmatrix} = \begin{pmatrix} P_{00} & P_{01} & P_{02} & P_{03} \\ P_{10} & P_{11} & P_{12} & P_{13} \\ P_{20} & P_{21} & P_{22} & P_{23} \end{pmatrix} \begin{pmatrix} X \\ Y \\ Z \\ 1 \end{pmatrix} \quad (1)$$

In the perspective transformation matrix, elements $P_{00}$, $P_{01}$, ..., and $P_{23}$ are determined as the parameter for three-dimensional measurement in each of the cameras A, B, and C, and the elements P00, P01, ..., and P23 are registered in the memory 23. The completion of the registration allows three-dimensional measurement to be performed on the workpiece W.

In the three-dimensional measurement processing of the embodiment, after the edges are extracted from the images produced by the cameras A, B, and C, each edge is divided into units called "segment" based on a connecting point or a branch point, and the points are correlated among the images. The computation is performed for every combination of correlated segments using the parameter, thereby deriving a set of three-dimensional coordinates expressing three-dimensional segment. Hereinafter the processing is referred to as "restoration of three-dimensional information" or "acquisition of three-dimensional information".

In this embodiment, processing contents (such as a threshold of density gradient strength for extracting the edge) in extracting the edge from the image produced by each of the cameras A, B, and C and processing contents concerting the restoration of three-dimensional segment (such as the number of three-dimensional coordinates extracted from the segment per unit length, a length of an extended portion in extending the short segment, and contents of noise reduction processing after the measurement) are set in order to perform the three-dimensional measurement processing. These pieces of setting information are also registered in a predetermined area of the memory 23.

Figure 3:
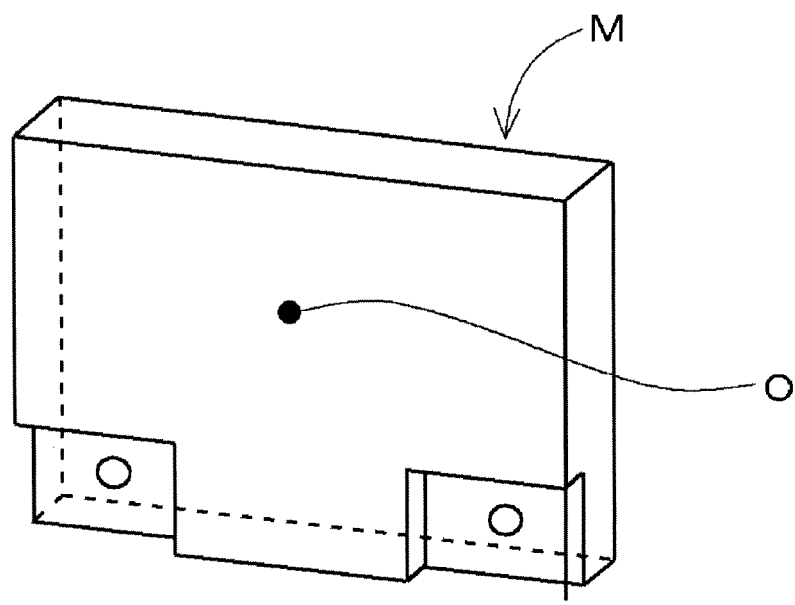
FIG. 3 illustrates a configuration example of a three-dimensional model.

Then, as illustrated in FIG. 3, a three-dimensional model M expressing a whole contour shape of the workpiece W is produced from the restored three-dimensional information in order to recognize the position and attitude of the workpiece W. After the calibration and the above-described setting processing are ended, a real model of the workpiece W is measured in a plurality of directions, and the pieces of three-dimensional information restored by the measurement are integrated to produce the three-dimensional model M. The three-dimensional model M includes a three-dimensional coordinate of a representative point O such as a gravity center in addition to the pieces of three-dimensional information on the plurality of segments.

However, the three-dimensional model producing method is not limited to the above-described method. For example, the three-dimensional model indicating the whole contour shape of the workpiece W may be produced from design data such as CAD data.

In the checking processing with the three-dimensional model M, a feature point (specifically, a branch point of the segment) indicating three-dimensional information obtained by the three-dimensional measurement and a feature point on the side of the three-dimensional model M are correlated by a round-robin method to compute a degree of similarity between both the sides. The correspondence between the feature points is specified as correct correspondence when the degree of similarity becomes the maximum. At this point, the coordinate corresponding to the representative point of the three-dimensional model M is recognized as the position of the workpiece W. When the specified correspondence is obtained between the feature points, the rotation angle of the three-dimensional model M is recognized as the rotation angle of the workpiece W with respect to the basic attitude indicated by the three-dimensional model M. The rotation angle is computed in each of the axes X, Y, and Z.

In this embodiment, at the end of the settings of various pieces of information, test recognition processing is performed by the set pieces of information using the real workpiece W, and two kinds of screens of FIG. 4 are displayed on the display unit 25 in order to confirm the recognition result.

An image expressing the edge in which the three-dimensional information is restored is displayed on the screen of FIG. 4A (hereinafter the image is referred to as "edge image"). The measurement edge image is produced by performing the perspective transformation of the three-dimensional information on the restored edge into the coordinate system of one of the cameras A, B, and C.

An image in which the three-dimensional model image whose position and attitude are changed according to the recognition result is superimposed on the measurement edge image is displayed on the screen of FIG. 4B (hereinafter referred to as "three-dimensional model image"). This three-dimensional model image is produced by performing coordinate transformation of the registered three-dimensional model (see FIG. 3) based on the recognition result, and then performing perspective transformation to three-dimensional model to which the coordinate transformation is already performed into the same coordinate system as the camera used to produce the measurement edge image.

In FIG. 4, a solid line expresses contour pattern indicated by the measurement edge image, and a dotted line expresses contour pattern indicated by the three-dimensional model image. Actually the contour pattern expressed by the solid line and the contour pattern expressed by the dotted line are expressed by different colors.

Figure 4A:
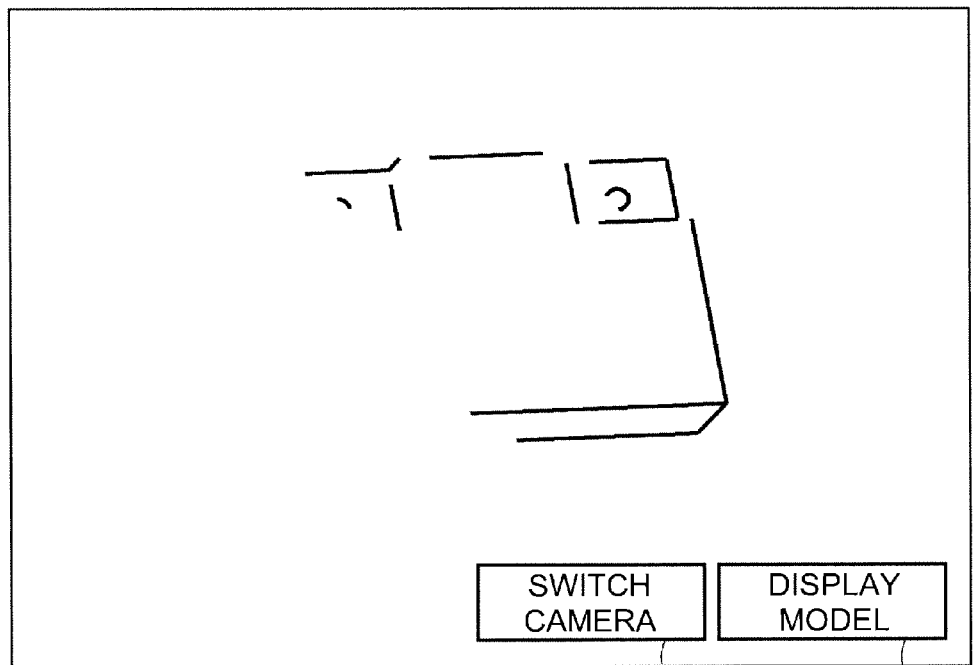
FIGS. 4A and 4B illustrate examples of display screens of a recognition result.
Figure 4B:
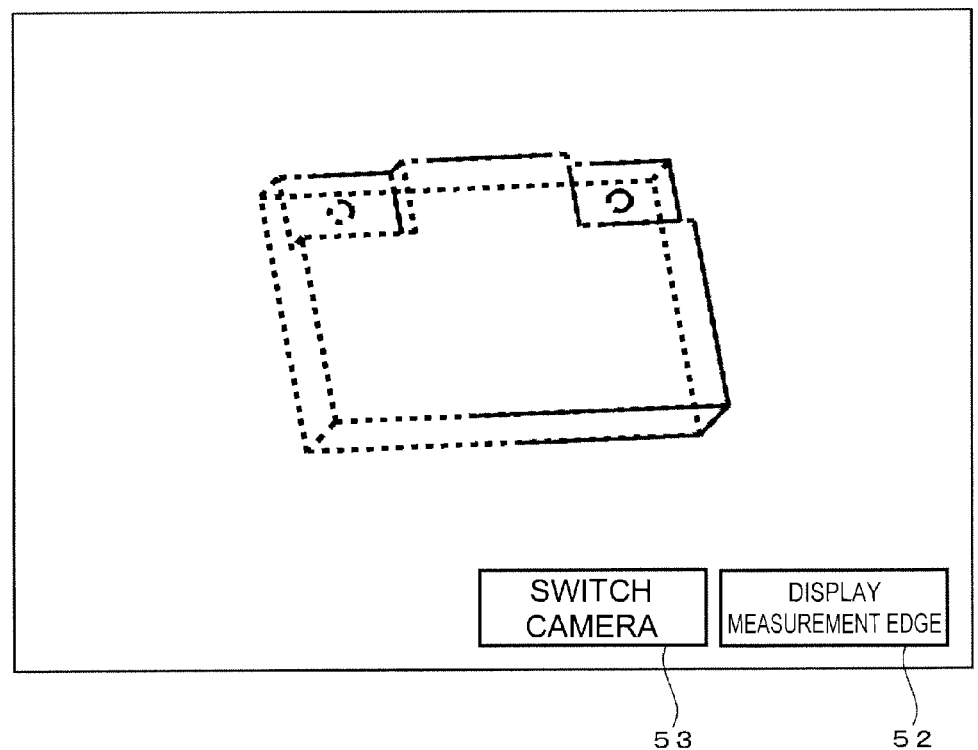

A button 51 and a button 53 are provided on the lower right of the screen of FIG. 4A. The button 51 is used to switch the display of the screen to the state of FIG. 4B, and the button 53 is used to switch the camera of the perspective transformation target. Instead of the button 51, a button 52 is provided on the lower right of FIG. 4B. The button 52 is used to switch the display of the screen to the state of FIG. 4A.

When the buttons 51 and 52 are repeatedly manipulated, the screen (FIG. 4A) in which only the measurement edge image is displayed and the screen (FIG. 4B) in which the measurement edge image and the three-dimensional model image are superimposed can alternately be displayed. When the button 53 is manipulated, the camera that is different from the camera used to produce the currently-displayed projection image can be selected to switch the display of the three-dimensional model image or the measurement edge image produced by the processing of the perspective transformation into the coordinate system of the camera.

In the measurement edge image, the edge in which the three-dimensional information is restored is disposed at the point corresponding to processing target image (the image of the workpiece W used in the recognition processing) used in the three-dimensional measurement. The three-dimensional model image corresponds to a contour of the workpiece W, which emerges in the image in imaging the workpiece W disposed at the recognized position and attitude.

Accordingly, a user can confirm which region edge of the workpiece W is restored as the three-dimensional information or how much the three-dimensional information is accurately restored from the screen (FIG. 4A) in which only the measurement edge image is displayed. The user can also confirm whether the three-dimensional model is correctly correlated with the restored three-dimensional information from the screen (FIG. 4B) in which the measurement edge image and the three-dimensional model image are superimposed.

For example, in the measurement edge image of FIG. 4, although the three-dimensional information on only part of the edge of the workpiece W is stored, a noticeable noise does not exist in the measurement edge image, and the images are accurately correlated with each other in the screen in which the measurement edge image and the three-dimensional model image are superimposed. A determination that the settings of the various kinds of information have no special trouble can be made when the display of FIG. 4 is displayed.

On the other hand, for the reduced accuracy of the calibration, or for the improper setting of the measurement processing, possibly the measurement edge image in which the contour shape of the workpiece W is not correctly reflected is produced or many noises are generated in the measurement edge image. In such cases, it is believed that the correspondence between the measurement edge image and the three-dimensional model image becomes improper.

Figure 5:
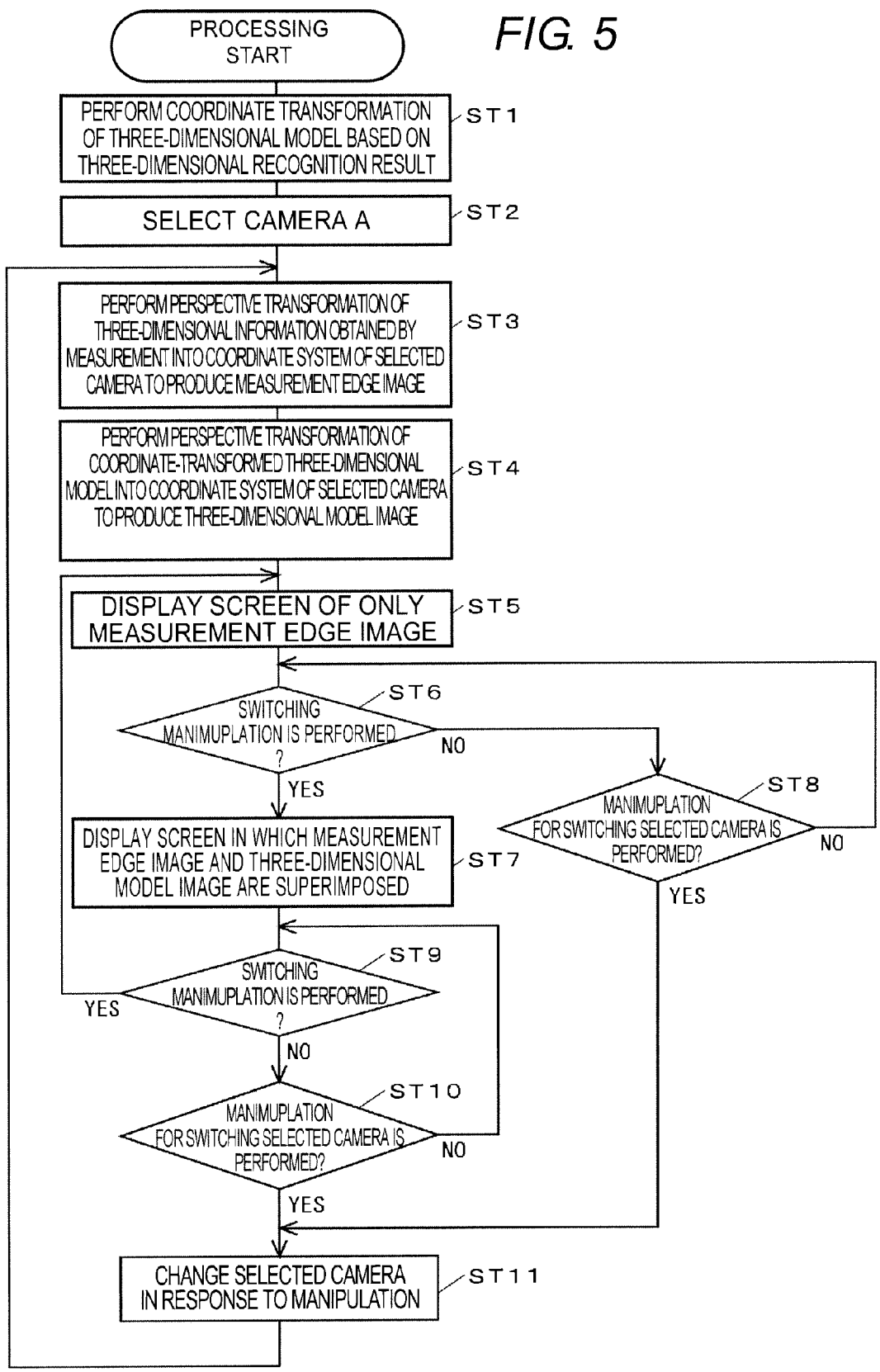
FIG. 5 is a flowchart illustrating a processing procedure concerning display of the recognition result.

FIG. 5 illustrates a string of procedures concerning the screen display.

After the calibration, the setting concerning the measurement processing, and the three-dimensional model registration processing are ended, the test recognition processing is performed to the workpiece W to recognize the position and rotation angle of the workpiece W. Then the screen display processing is started.

In step ST1, the coordinate transformation of the three-dimensional model M registered in the memory 23 is performed based on the position and rotation angle, which are recognized in the workpiece W. Specifically, a position deviation amount of the coordinate that is recognized as the representative point of the workpiece W is determined in each of the axes X, Y, and Z to the coordinate that is registered with respect to the representative point O of the three-dimensional model M. Elements $T_{00}, T_{01}, \ldots,$ and $T_{23}$ (see the following equation (2)) of a transformation matrix of homogenous coordinate transformation are determined based on the position deviation amounts and the angle (rotation angle in each of the axes X, Y, and Z) computed as the rotation angle of the workpiece W to the three-dimensional model, and the coordinate of each point included in the three-dimensional model is substituted for the equation (2) to which the transformation matrix is set. The set of coordinates (Xt, Yt, Zt) obtained by the transformation of the equation (2) is the coordinate-transformed three-dimensional model.

[Formula 2]

$$\begin{pmatrix} X_t \\ Y_t \\ Z_t \end{pmatrix} = \begin{pmatrix} T_{00} & T_{01} & T_{02} & T_{03} \\ T_{10} & T_{11} & T_{12} & T_{13} \\ T_{20} & T_{21} & T_{22} & T_{23} \end{pmatrix} \begin{pmatrix} X_{MP} \\ Y_{MP} \\ Z_{MP} \end{pmatrix} \quad (2)$$

A manipulation for selecting one of the three cameras is received (ST2), and the perspective transformation of the three-dimensional information on the edge obtained by the three-dimensional measurement of the workpiece W is performed into the coordinate system of the selected camera. Therefore, the measurement edge image is produced (ST3).

The three-dimensional model image is produced by performing the perspective transformation of the coordinate-transformed three-dimensional model into the coordinate system of the selected camera (ST4).

The following equation (3) obtained by modifying the equation (1) (($P_{20}X+P_{21}Y+P_{22}Z+P_{23}$) in the equation (3) corresponds to S of the equation (1)) is used in the perspective transformation processing in steps ST3 and ST4. That is, each three-dimensional coordinate of the coordinate-transformed three-dimensional model is substituted for (X, Y, Z) to compute the equation (3), thereby obtaining the transformed coordinate (x, y).

[Formula 3]

$$\begin{pmatrix} x \\ y \end{pmatrix} = \frac{1}{P_{20}X + P_{21}Y + P_{22}Z + P_{23}} \begin{pmatrix} P_{00} & P_{01} & P_{02} & P_{03} \\ P_{10} & P_{11} & P_{12} & P_{13} \end{pmatrix} \begin{pmatrix} X \\ Y \\ Z \\ 1 \end{pmatrix} \quad (3)$$

When the measurement edge image and the three-dimensional model image are produced through the above perspective transformation processing, the screen (FIG. 4A) in which only the measurement edge image is displayed is started up (ST5). At this point, when the button 51 provided on the lower right of the screen is manipulated ("YES" in ST6), the screen (FIG. 4A) is updated to the screen (FIG. 4B) in which the measurement edge image and the three-dimensional model image are superimposed in response to the manipulation (ST7). When the button 52 of the display screen is manipulated ("YES" in ST9), the display is returned to the screen in which only the measurement edge image is displayed (ST5).

Similarly the two screens are alternately switched in response to the manipulation for switching the screens. When the manipulation for switching the selected camera while one of the screens is displayed ("YES" in ST8 or ST10), the camera is selected in response to the manipulation (ST11), and the perspective transformation processing is performed to the coordinate system of the newly-selected camera (ST3 and ST4).

The display of only the measurement edge image (ST5) and the display of the superimposition of the measurement edge image and the three-dimensional model image (ST7) are alternately switched by performing the similar procedure in response to the switching manipulation. When the manipulation for switching the selected camera is performed again ("YES" in ST8 or ST10), the measurement edge image and the three-dimensional model image are produced according to the coordinate system of the newly-selected camera (ST3 and ST4), and the processing for displaying the images are performed in the same manner.

The display mode of each image is not limited to the example of FIG. 4. For example, the screen in which only the measurement edge image is displayed and the screen in which only the three-dimensional model image is displayed may alternately be displayed, the screen in which only the measurement edge image is displayed and the screen in which only the three-dimensional model image is displayed may be displayed in parallel, or only the screen in which the measurement edge image and the model image are superimposed may be displayed.

In any display, the processing target image produced by the camera selected in the perspective transformation processing may concurrently be displayed. Alternatively, the screen in which the processing target image and the measurement edge image or the contour image indicated by the three-dimensional model image are superimposed and the screen in which only the contour image is displayed may alternately be displayed according to the switching manipulation. Therefore, the user can quickly determine whether the measurement result or the checking result is matched with the processing target image.

In the above-described embodiment, only one camera of the three cameras constituting the stereo camera 1 is displayed. Alternatively, the measurement edge images or three-dimensional model images, which are produced by the cameras A, B, and C, may be displayed in one screen.

In the above-described embodiment, the measurement edge image or the three-dimensional model image is displayed in order to confirm whether the setting contents are proper. Alternatively, after the confirmation that the setting contents are proper is made to start the full-fledged recognition processing, the similar display may be performed in order to confirm the recognition result. Therefore, the user can appropriately confirm the propriety of the recognition processing or the recognition accuracy to enhance the user-friendliness.

In the processing of FIG. 5, the perspective transformation of the three-dimensional model M is initially performed based on the recognition result (ST1). When the coordinate transformation result obtained by the checking processing with the three-dimensional model M in the preceding recognition processing is retained, step ST1 can be omitted by using the retained data of the coordinate transformation result.

In the three-dimensional visual sensor 100 of the above-described embodiment, the three-dimensional information on the edge of the workpiece W is obtained by the stereo measurement using the plurality of cameras A, B, and C. Alternatively, for example, the display similar to that of the above-described embodiment may be displayed in a device in which the three-dimensional information, obtained by processing the two-dimensional image based on a light cutting method, at a folding point in the image is checked with the three-dimensional model.

What is claimed is:

1. A three-dimensional recognition result displaying method for inspecting a recognition-target object of manufacture,
wherein three-dimensional information on an edge in an image is obtained through measurement processing, the image is produced by imaging the recognition-target object; and a recognition result is displayed after a position and an attitude of the recognition-target object are recognized by checking the three-dimensional information with a three-dimensional model expressing an outline shape of the recognition-target object, the method comprising:
a first step of performing, by one or more computers, perspective transformation of three-dimensional information on the edge obtained through the measurement processing and three-dimensional model to which coordinate transformation is performed based on the recognized position and the attitude of the recognition-target object into a coordinate system of an imaging unit that performs the imaging; and
a second step of displaying one or more images on a display, the display being configured for switching between
display of only an edge projection image of the recognition-target object produced by the perspective transformation and
display of only a projection image of the three-dimensional model of the recognition-target object on the display, and for switching between
display of only the edge projection image and
display of a superimposition of the edge projection image and the projection image, wherein the display is further configured for switching between
display of the one or more images and
display of one or more edge respective projection image of the recognition-target object or projection image of the three-dimensional model of the recognition-target object that are corresponding to the one or more images and produced based on a coordinate system of a second imaging unit performing the imaging of the recognition-target object obtained by re-performing the perspective transformation in the first step.

2. The three-dimensional recognition result displaying method according to claim 1, wherein the second step comprises:
displaying, on the display, a first button for allowing a user to switch between the display of only the edge projection image and the display of the superimposition of the edge projection image and the projection image; and
a second button for allowing a user to switch between the display of the one or more images and the display of the one or more respective edge projection image or projection image.

3. The three-dimensional recognition result displaying method according to claim 2, wherein
the edge projection image is displayed using a first color; and
the projection image is displayed using a second color different from the first color.

4. The method as claimed in claim 1, wherein
said switching between the display of only the edge projection image and the display of only the projection image, and
said switching between the display of only the edge projection image and the display of the superimposition of the edge projection image and the projection image
are performed through one or more user selectable buttons displayed on the display, and
said switching between the display of the one or more images and the display of the one or more respective edge projection image or projection image is performed through another user selectable button displayed on the display.

5. A non-transitory computer readable medium storing computer program code for performing three-dimensional visual inspection of a recognition-target object of manufacture, the computer program code, when executed by at least one computer, causes the at least one computer to perform the functions of:
imaging the recognition-target object;
obtaining three-dimensional information on an edge in an image through measurement processing, the image being produced by the imaging;
registering a three-dimensional model expressing an outline shape of the recognition-target object;
recognizing a position and an attitude of the recognition-target object by checking the three-dimensional information obtained by the measurement unit with the registered three-dimensional model;
performing perspective transformation of three-dimensional information on the edge obtained and three-dimensional model to which coordinate transformation is performed based on the recognized position and the attitude of the recognition-target object into a coordinate system of an imaging unit performing the imaging of the recognition-target object; and
displaying one or more images on a display, the display being configured for
switching between
display of only an edge projection image of the recognition-target object produced by the perspective transformation and
display of only a projection image of the three-dimensional model of the recognition-target object on the display,
and for switching between
display of only the edge projection image and display of a superimposition of the edge projection image and the projection image, wherein the display is further configured for switching between display of the one or more images and display of one or more respective edge projection image of the recognition-target object or projection image of the three-dimensional model of the recognition-target object that are corresponding to the one or more images and produced based on a coordinate system of a second imaging unit performing the imaging of the recognition-target object obtained by re-performing the perspective transformation.

6. The non-transitory computer readable medium according to claim 5, wherein the display is configured for displaying a first button for allowing a user to switch between the display of only the edge projection image and the display of the superimposition of the edge projection image and the projection image; and a second button for allowing a user to switch between the display of the one or more images and the display of the one or more respective edge projection image or projection image.

7. The non-transitory computer readable medium according to claim 6, wherein the edge projection image is displayed using a first color and the projection image is displayed using a second color different from the first color.

8. The non-transitory computer readable medium according to claim 5, wherein said switching between the display of only the edge projection image and the display of only the projection image, and said switching between the display of only the edge projection image and the display of the superimposition of the edge projection image and the projection image are performed through one or more user selectable buttons displayed on the display, and said switching between the display of the one or more images and the display of the one or more respective edge projection image or projection image is performed through another user selectable button displayed on the display.

\* \* \* \* \*